US011710000B1

(12) United States Patent
Cuan et al.

(10) Patent No.: US 11,710,000 B1
(45) Date of Patent: Jul. 25, 2023

(54) EMAIL REWRITE AND REORGANIZATION

(71) Applicant: Capital One Services, LLC, McLean, VA (US)

(72) Inventors: Lukiih Cuan, Washington, DC (US); Lea Cody, Washington, DC (US); Cruz Vargas, Ocean Springs, MS (US); Latika Gulati, Vienna, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/838,725

(22) Filed: Jun. 13, 2022

(51) Int. Cl.
*G06F 40/40* (2020.01)
*H04L 51/42* (2022.01)
*H04L 51/21* (2022.01)

(52) U.S. Cl.
CPC .............. *G06F 40/40* (2020.01); *H04L 51/21* (2022.05); *H04L 51/42* (2022.05)

(58) Field of Classification Search
None
See application file for complete search history.

(56) References Cited

U.S. PATENT DOCUMENTS

| | | | | |
|---|---|---|---|---|
| 7,392,280 B2 * | 6/2008 | Rohall | ................. | H04L 51/216 709/201 |
| 7,702,680 B2 * | 4/2010 | Yih | ....................... | G06F 16/345 707/750 |
| 7,761,519 B2 * | 7/2010 | Schultz | ............... | G06Q 10/107 709/206 |
| 7,761,524 B2 * | 7/2010 | Carmel | ............... | G06Q 10/107 709/206 |
| 8,161,122 B2 | 4/2012 | Sood et al. | | |
| 8,195,588 B2 * | 6/2012 | Gupta | .................. | G06Q 10/107 706/20 |
| 8,392,252 B2 * | 3/2013 | Kaufman | ........... | G06Q 30/0242 705/7.29 |
| 8,645,430 B2 * | 2/2014 | Khouri | ................ | G06Q 10/107 709/206 |
| 9,088,533 B1 * | 7/2015 | Zeng | ..................... | H04L 51/234 |
| 9,116,984 B2 * | 8/2015 | Caldwell | .............. | G06F 16/345 |
| 9,251,507 B2 * | 2/2016 | Jensen | ................ | G06Q 10/107 |
| 9,483,532 B1 * | 11/2016 | Zhang | ............... | G06F 16/24553 |
| 9,734,248 B2 * | 8/2017 | Avkd | .................... | G06F 16/951 |
| 10,102,192 B2 * | 10/2018 | Upadhyay | ............ | H04L 51/046 |

(Continued)

FOREIGN PATENT DOCUMENTS

| CN | 110837553 | 2/2020 |
|---|---|---|
| CN | 113055278 | 6/2021 |

*Primary Examiner* — Backhean Tiv
(74) *Attorney, Agent, or Firm* — Perkins Coie LLP (57) ABSTRACT

Commercial emails are rewritten to aid user understanding and usability. A commercial email is identified from a set of email messages received by an email client for a user. The content of the commercial email is analyzed to identify salient facts associated with the terms of a sale specified by the content. A simplified subject line for the commercial email is generated based on the salient facts and used to replace the original subject line. Priority scores can also be computed based on user transaction history, time, or other factors. The priority scores can then be utilized to organize commercial emails. Further, commercial emails can be segmented from other emails, such as personal or work emails.

20 Claims, 8 Drawing Sheets

(56) References Cited

U.S. PATENT DOCUMENTS

| | | | |
|---|---|---|---|
| 10,235,346 B2* | 3/2019 | Lefebvre | G06F 40/10 |
| 10,348,667 B2* | 7/2019 | Sharp | H04L 51/212 |
| 10,606,959 B2* | 3/2020 | Dockhorn | G06V 30/416 |
| 10,832,009 B2 | 11/2020 | Bonin et al. | |
| 10,885,548 B2* | 1/2021 | Karnin | G06Q 30/0251 |
| 11,048,880 B2 | 6/2021 | Ghatak et al. | |
| 11,165,730 B2* | 11/2021 | Toper | H04L 51/212 |
| 2007/0106739 A1* | 5/2007 | Clark | H04L 51/58 |
| | | | 709/206 |
| 2008/0281922 A1* | 11/2008 | Renshaw | G06F 16/345 |
| | | | 709/206 |
| 2010/0191578 A1* | 7/2010 | Tran | G06Q 30/0601 |
| | | | 705/26.7 |
| 2012/0331074 A1* | 12/2012 | Fox | H04L 63/126 |
| | | | 709/206 |
| 2014/0297402 A1* | 10/2014 | Soudak | G06Q 30/0246 |
| | | | 705/14.45 |
| 2014/0310324 A1* | 10/2014 | Branton | G06F 7/24 |
| | | | 707/830 |
| 2015/0294220 A1 | 10/2015 | Oreif | |
| 2015/0341300 A1 | 11/2015 | Swain et al. | |
| 2016/0182417 A1 | 6/2016 | Cordes et al. | |
| 2016/0226811 A1* | 8/2016 | Kerschhofer | H04L 51/226 |
| 2017/0161372 A1* | 6/2017 | Fernández | G06F 40/211 |
| 2017/0200133 A1 | 7/2017 | Werner et al. | |
| 2018/0176163 A1* | 6/2018 | Arquero | G06F 40/30 |
| 2020/0034433 A1 | 1/2020 | Cassidy | |
| 2020/0226216 A1 | 7/2020 | Marin et al. | |
| 2021/0133287 A1* | 5/2021 | Ayloo | G06F 40/274 |

* cited by examiner

EMAIL REWRITE AND REORGANIZATION

BACKGROUND

Electronic mail, or email, is a popular communication medium across the globe. The popularity is due to at least two factors, namely speed and cost. Email is much faster to send and receive than conventional mail, often called snail mail. Further, it is relatively inexpensive in that all that is needed is a computing device, which is commonplace, and a free email service. While email is a beneficial communication medium for users, it is also incredibly valuable to commercial entities seeking to sell products and services.

Users are often inundated with emails daily, making it difficult to identify critical or valuable emails. Users can employ spam filters to aid in decluttering an inbox by removing unsolicited messages sent in bulk by email or, in other words, spam. However, even solicited email messages from various commercial entities can feel overwhelming for users.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to email rewriting and reorganization to aid user understanding and usability. A commercial email is identified from a set of received emails based on at least the sender's email address. Subsequently, the email is analyzed to identify salient facts set forth by the email, for example, concerning a sale or promotion of a product or service, such as the item, discount, and expiration date. A subject line can then be generated for the email from the result of the analysis of the email content, such that the subject line aids user understanding of the content of the email at a glance. The generated subject line can then replace the original subject line of an email. Further, emails can be grouped based on whether the emails are commercial or not and ordered based on priority determined based on email content and user information.

According to one aspect, disclosed embodiments can include an email rewrite system is provided that comprises a processor coupled to a memory that includes instructions that, when executed by the processor, cause the processor to identify a commercial email from a set of email messages received by an email client for a user with a first machine learning model trained to classify emails as commercial or noncommercial and analyze content of the commercial email to identify salient facts comprising terms of a sale specified in the commercial email with a second machine learning model trained to summarize content. The instructions can further cause the processor to generate a proposed subject line based on the salient facts, replace the original subject line of the commercial email with the proposed subject line in the email client, and add an indicator to the subject line that indicates the subject line is rewritten and, when activated, displays the original subject line of the commercial email. In one instance, the first machine learning model performs natural language processing to classify the email messages based on email message content. The instructions can further cause the processor to extract the email message content from an image with a third machine learning model trained to perform optical character recognition. In another instance, the first machine learning model is trained to classify the email messages based on transaction history of a user and seller email addresses. Further, the second machine learning model can be a transformer that combines a convolutional neural network with an attention model. The instructions can further cause the processor to compute a difference between an original subject line and the proposed subject line in terms of descriptiveness and replace the original subject line with the proposed subject line when the difference satisfies a predetermined threshold. Further, the instructions can cause the processor to identify a subject-line template and fill the template with the salient facts to produce the proposed subject line. The instructions can also cause the processor to compute a priority score for the commercial email based on prior user transaction data and render a set of commercial emails based on the priority score.

In accordance with another aspect, disclosed embodiments can include a method comprising executing, on a processor, instructions that cause the processor to perform operations associated with rewriting email subject lines of commercial emails. The operations include identifying a commercial email from a set of emails received by an email client for a user, analyzing content of the commercial email to identify salient facts comprising terms of a sale specified in the commercial email with a first machine learning model trained to summarize content, generating a proposed subject line based on the salient facts, replacing the original subject line of the commercial email with the proposed subject line in the email client, and adding an indicator to the subject line that indicates the subject line is rewritten and, when activated, displays the original subject line of the commercial email. The operations further comprise comparing an email address to an email address associated with transaction history of the user to identify the commercial email as well as identifying the commercial email with a second machine learning model trained to classify emails as commercial or noncommercial based on email message content. Further, the operations can comprise invoking, as the first machine learning model, a transformer to automatically identify the salient facts, wherein the transformer combines a convolutional neural network with an attention model. The method can further comprise operations, including determining a priority score for the commercial email based on prior user transaction data and rendering a set of commercial emails based on the priority score for each commercial email. Further, the operations can comprise comparing content of an original subject line of the commercial email to the proposed subject line and replacing the original subject line of the commercial email with the proposed subject line when a result of the comparing satisfies a predetermined threshold.

According to yet another aspect, disclosed embodiments can include a computer-implemented method of email rewriting comprising identifying commercial email from a set of emails received by an email client for a user with a first machine learning model trained to identify commercial emails based on email message content, determining salient facts from context of the commercial email with a second machine learning model trained to summarize content, wherein the salient facts correspond to terms of a sale or promotion in the commercial email, generating a proposed subject line based on the salient facts and a template associated with a type of the commercial email, and replacing an original subject line with the proposed subject line. The method can further comprise invoking image analysis to extract text from an image in the commercial email, wherein the text forms part of the email message content in at least one of determining salient facts or identifying the commercial email. Further, the method can comprise determining the salient facts with a transformer that combines a convolutional neural network with an attention model. The method can also comprise determining a priority score for the commercial email and causing a set of commercial emails to be ordered based on the priority score determined for each email.

To the accomplishment of the foregoing and related ends, certain illustrative aspects of the claimed subject matter are described herein in connection with the following description and the annexed drawings. These aspects indicate various ways in which the subject matter can be practiced, all of which are intended to be within the scope of the disclosed subject matter. Other advantages and novel features may become apparent from the following detailed description when considered in conjunction with the drawings.

DETAILED DESCRIPTION

Email can inundate users, causing an overwhelmed feeling of clutter and spam. This feeling can lead users to unsubscribe from companies, delete unread emails, miss key content, or ignore time-sensitive content, among other things. Spam filters can help remove unsolicited and potentially harmful emails. However, spam filters are fallible, and many solicited emails can still be problematic for users.

Details disclosed herein generally pertain to email rewrite and reorganization. An inbox of an email client is analyzed to identify commercial and noncommercial emails, where a commercial email has a primary purpose of advertisement or promotion of a product or service. A commercial email is analyzed to identify salient facts related to a sale or promotion of a product or service. Subsequently, an email subject line is generated based on the identified facts. In one instance, the subject line can correspond to a text summary of email content produced by a transformer. Alternatively, a subject line template can be employed that is completed with identified facts. Regardless, the original email subject line is replaced by the generated subject line. Rewriting the subject line of commercial emails simplifies an inbox by eliminating clickbait language and including solely relevant information concerning the terms of a commercial advertisement (e.g., item, discount, conditions, expiration date). Furthermore, an inbox can be reorganized to segment commercial emails from personal emails. Moreover, commercial emails can be ordered based on priority scores computed based on the salient facts of the email, prior user transactions, and other context data. An email inbox is thus presented that aids user understanding and usability by rewriting subject lines, segmenting commercial email, and ordering commercial email based on priority.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
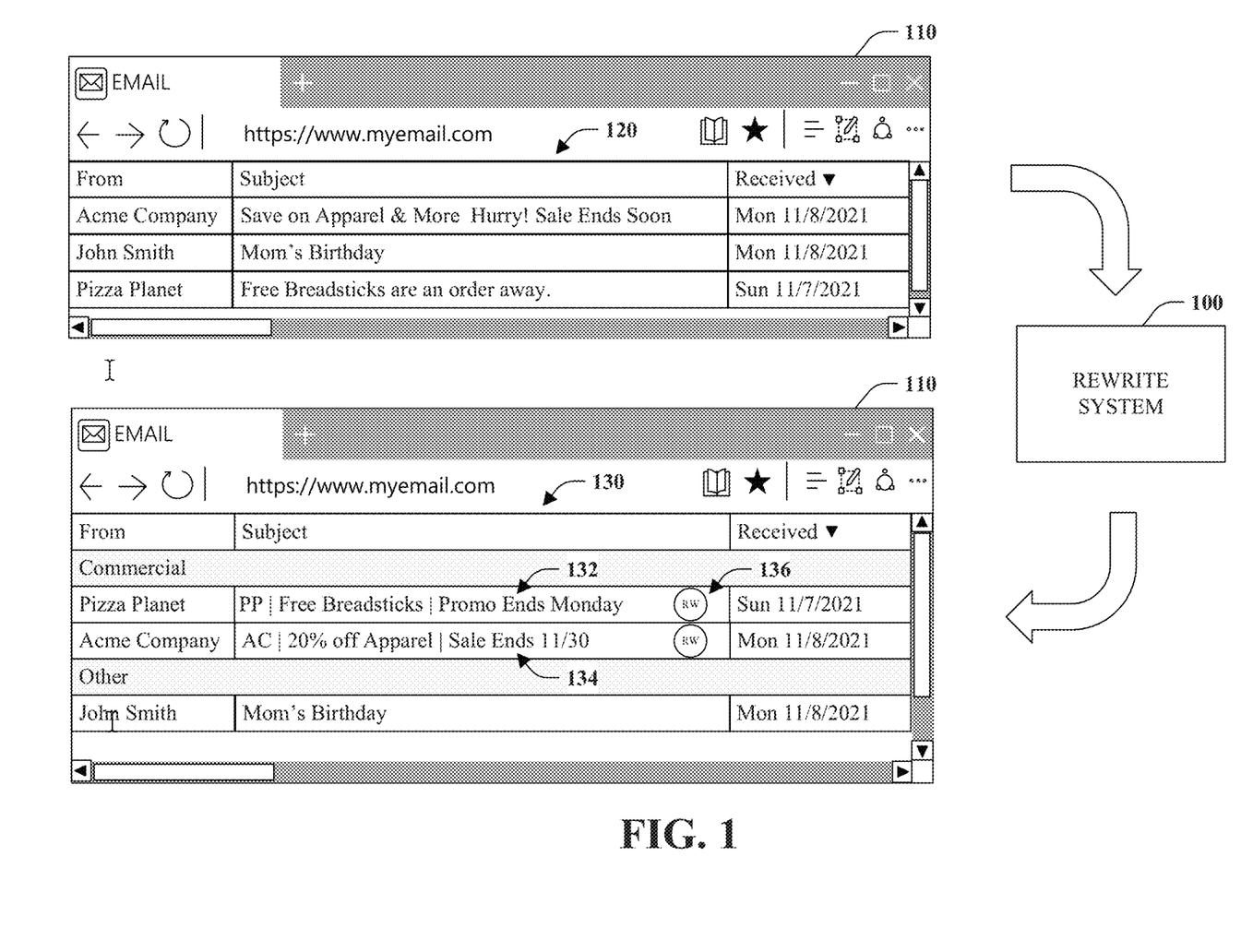
FIG. 1 illustrates an overview of an example implementation.

Referring initially to FIG. 1, a high-level overview of an example implementation is depicted. As shown, the implementation includes rewrite system 100, web browser 110, original email listing 120, and rewritten email listing 130.

The web browser 110 provides a web-service email client for user interaction and, more specifically, an inbox comprising a plurality of received emails. The web browser 110 presents an original email listing 120. Here, the original email listing includes four emails in a table format with "From," "Subject," and "Received" headers. The most recent email is from "Acme Company" with the subject line "Save on Apparel & More. Hurry! Sale Ends Soon" received on Monday, Nov. 8, 2021. The second email is from "John Smith" with the subject line "Mom's Birthday" received on Monday, Nov. 8, 2021, and the third email is from "Pizza Planet" with the subject line "Free Breadsticks are an order away" received on Sunday, Nov. 7, 2021. The original email listing 120 is solely a representative subset of dozens or hundreds of emails typically received.

The rewrite system 100 is operable to analyze the original listing 120 and generate a new rewritten email listing 130. The rewrite system 100 can be embodied as a browser extension or included as part of any email system. In one particular instance, the rewrite system 100 can seek to rewrite the subject line of commercial emails to make them more helpful to users. Senders design commercial email subject lines to promote click-through to the email content that often obscures salient information, but can allude to such information to entice a user to click and investigate further. In other words, the subject lines are clickbait and may not provide particularly useful information to a user. The rewrite system 100 seeks to remedy this problem by rewriting subject lines for commercial emails that summarize salient facts in the subject lines themselves.

First, the rewrite system 100 analyzes the emails to determine commercial emails in the original email listing 120. The rewrite system 100 can detect that the first and third emails in the original email listing 120 are commercial. This can be determined by comparing the sender email address or alias to a database of known commercial entities. Alternatively, the rewrite system 100 can compare a sender email address to an email address associated with the user's transaction history. Other information such as signature block or other email content can also be employed to classify an email as either commercial, noncommercial, or other. In fact, a machine learning classifier model can be trained and invoked to classify email automatically.

For each commercial email, the content of the email can be analyzed for one or more salient facts. Salient facts are pieces of information that are prominent or conspicuous, including details regarding a sale or promotion, such as the items, discount, and expiration date. In one implementation, text summary technology can be employed to extract the salient facts. For example, a transformer that combines a convolutional neural network with an attention model can be utilized to summarize email text. Since many commercial emails utilize images or graphics in place of or in addition to text, image analysis techniques, such as optical character recognition (OCR), can convert an image to a textual representation prior to analysis for salient facts. In other words, information conveyed by an image can be captured as text, which a transformer can then summarize.

In one instance, a text summary can correspond to the subject line rewrite. In another instance, a template can be employed. The template can be a default or predetermined template or a particular template associated with a type of commercial email. The rewrite system 100 can complete the template with salient facts extracted from the text. The template utilized in this implementation is company name abbreviation, slash, sale or promotional offer, slash, expiration date. More specifically, subject line 132 specifies "PP|Free Breadsticks|Promo Ends Monday" instead of "Free Breadsticks are an order away." Likewise, subject line 134 denotes "AC|20% off Apparel|Sale Ends 11/30" instead of "Save on Apparel & More Hurry! Sale Ends Soon."

In addition to rewriting subject lines, the rewrite system 100 can add an indicator 136 to the subject line that specifies that the subject line was rewritten. Here, the indicator 136 is depicted with the letters "RW" (ReWrite) encircled and positioned at the end of the rewritten subject line. Of course, substantially any mechanism, including graphic, color, font, or style, can be used as an indicator 136. Further, the indicator 136 can also provide a means for revealing the original subject line. For example, upon selecting or activating the indicator 136 the original subject line can be displayed. In one embodiment, the original subject line can be displayed in addition to the rewritten subject line, for example, as a tooltip or hint. In another embodiment, the original subject line can replace the rewritten subject line. In one instance, the replacement can be temporary as a function of the activation of the indicator 136 or after a predetermined time. In another instance, a first activation of the indicator can cause the original subject line to appear, and a second activation of the indicator 136 can result in the rewritten subject line being displayed.

The rewrite system 100 can also rewrite or reorganize the original email listing 120. The original email listing 120 can be transformed into the rewritten email listing 130 with groups or categories. In one instance, commercial emails can be segmented from all other emails, as shown.

Furthermore, emails in the commercial category can be analyzed and a priority score computed based on salient facts and transaction history of a user, among other things. The group of commercial emails can then be organized and presented based on priority. For example, in the rewritten email listing 130, the email from Pizza Planet is presented before the email from Acme Company. Despite the email from Pizza Planet being received a day earlier, the email is listed before the current-date email from Acme Company based on a higher priority score for the email from Pizza Planet than for Acme Company. In one instance, a user may conduct frequent business with Pizza Planet but rarely, if ever, do business with Acme Company. Further, the promotion from Pizza Planet expires earlier than the sale from the Acme Company. Still further yet, it may be known based on transaction history that the user regularly orders pizza on Sunday or Monday. These factors can contribute to a high priority score for the email from Pizza Planet. Although not depicted, the rewritten email listing 130 can also include a label or graphic element that communicates the priority score.

Figure 2:
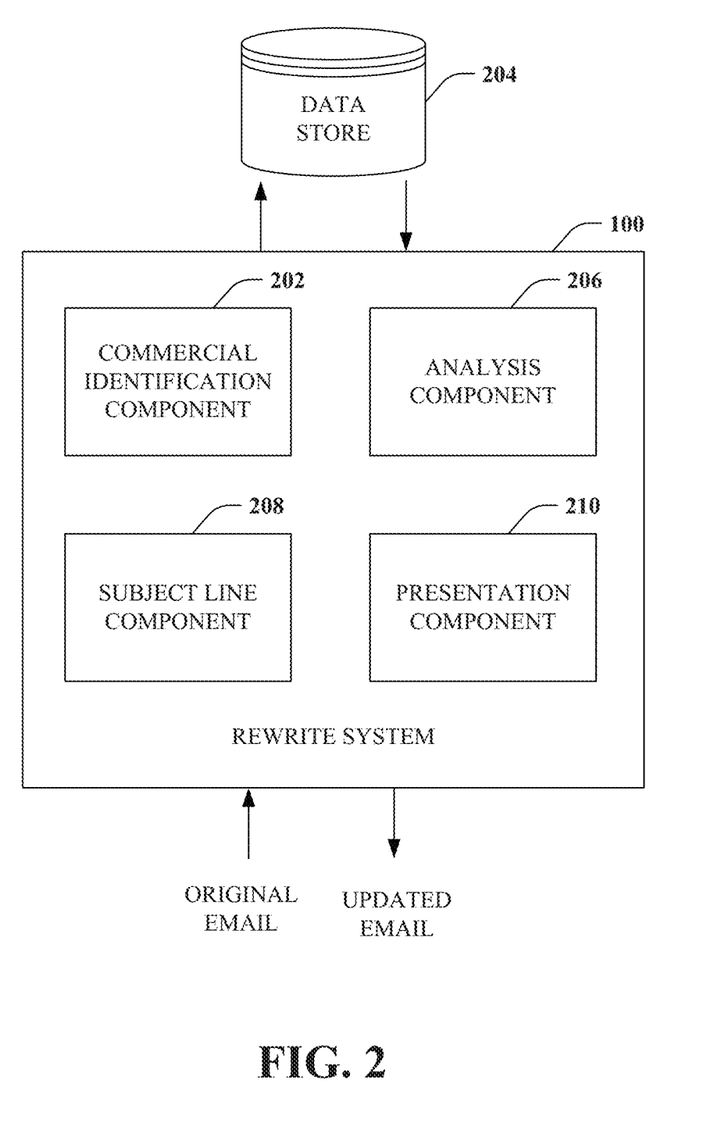
FIG. 2 is a block diagram of an example rewrite system.

FIG. 2 is a block diagram depicting the rewrite system 100 in further example detail. The rewrite system 100 includes commercial identification component 202, data store 204, analysis component 206, subject line component 208, and presentation component 210. The commercial identification component 202, analysis component 206, subject line component 208, and presentation component 210 can be implemented by a processor coupled to a memory that stores instructions that cause the processor to perform the functionality of each component when executed. Consequently, a computing device can be configured to be a special-purpose device or appliance that implements the functionality of the rewrite system 100. Further, portions of the system 100 can be distributed across computing devices or made accessible through a network service. The data store 204 corresponds to a persistent store 204 that saves and makes data available to components of the system 100. The data store can be local or remote to the components and distributed across devices. In accordance with one embodiment, the rewrite system 100 can be implemented as a browser or native email client extension. Alternatively, the rewrite system can form part of the email client itself, or the rewrite system 100 can spawn a visualization of an inbox separate from the email client.

The commercial identification component 202 is operable to identify commercial emails. Commercial emails are any electronic mail message with the primary purpose of commercial advertisement or promotion of a product or service. Email can be classified based on sender email address or portion thereof in one embodiment. For example, the data store 204 can store a list of known commercial email user names or domain names, and an email can be classified based on whether it matches one of the user names or domain names in the list. The data store 204 can also correspond to and store user purchase transactions and related domain names or user names. As such, the commercial identification component 202 can also compare an email to the transaction history of a user to determine whether the email is commercial or not.

In another embodiment, the commercial identification component 202 can perform classification or categorization of an email as either commercial or noncommercial. For instance, machine learning classification models, also called classifiers, can be generated that automatically classify emails. The classification model can perform pattern recognition to find the same or similar pattern associated with known commercial emails to input emails. For example, linear regression, support vector machines, naive Bayes, or k-nearest neighbor can be employed.

The analysis component 206 is operable to analyze the content of an email and identify salient factors or key information regarding a commercial email. For example, the analysis component 206 can identify the nature of a sale or promotion, including items, discount, and expiration date. The analysis component 206 can implement pattern matching to identify the salient factors based on experience with known salient factors for emails. Further, the analysis component 206 can implement or invoke a machine learning model to automatically identify the salient factors. In one instance, a particular type of machine learning model can be employed called a transformer. A transformer combines a convolutional neural network with an attention model that can summarize content, here, email content. The transformer can summarize the email content in a sentence or two that focus on commercial aspects that would be helpful for a user to know at a glance.

The analysis component 206 can also include or invoke image analysis functionality. Many commercial emails utilize graphics in place of or in addition to text. If email content includes an image or graphics, image analysis techniques, including optical character recognition (OCR), can be employed to convert the image to a textual representation. In other words, information conveyed by an image can be captured as text. The text can then be analyzed as native email text to determine the salient factors.

The subject line component 208 is operable to generate a new subject line for an email. The subject line component 206 can receive, retrieve, or otherwise obtain or acquire salient facts or a summary of email content determined by the analysis component 206. This input can then be utilized to generate a new subject line. In accordance with one embodiment, the subject line component 208 can employ a template that is completed or filled with the salient facts. In one instance, the salient facts or summary can be analyzed to determine a type of commercial email (e.g., flash sale, seasonal sale, limited promotion). Based on the type of commercial email, a predetermined template associated with the type can be employed to generate a new subject line. A template can be designed not as clickbait but rather to aid a user in understanding the promotion without the need to open the email. Further, the templates can be personalized or customized for particular users in terms of format as well as the information provided. A default template can be utilized for commercial emails in the absence of a type-specific or customized template. For example, the default template can identify the type of sale or promotion in terms of the products or services discounted, the discount, expiration date, and any other pertinent information (e.g., purchase required, total equal to or exceeding a value).

The presentation component 210 is operable to generate or update the email presentation on a display. In the scenario in which the rewrite system 100 is incorporated natively into an email client, the presentation component 210 can influence the initial display of email to a user. Alternatively, if the rewrite system is embodied as an extension, such as a browser extension, the presentation component 210 can replace, overwrite, or augment the presentation of email on a display. Still further yet, the presentation component 210 can generate an interface separate from the email client with which to present emails in an inbox. Regardless of the embodiment, the presentation component 210 is configured to replace the original subject line specified by the sender of the email with a rewritten subject line generated by the subject line component 208. Furthermore, the presentation component 210 is also operable to group and organize emails.

In one embodiment, before replacement, the generated subject line and the original subject line can be compared in terms of a metric associated with presentation of useful information. If the original subject line provides more useful or better information, the original subject line can remain and not be replaced.

In another embodiment, an option can be presented to switch between the original and rewritten subject line per email or for a set of emails. In one instance, an option can be selected to activate a different view. In another instance, a switch can be activated between a rewritten subject line and the original subject line or vice versa by hovering a cursor over the subject line or tapping and holding down on the subject line on a touch screen. In other words, the rewritten or original subject line can be visualized as a tooltip, infotip, or hint on a user interface.

In another embodiment, the presentation component 210 can present both the original and rewritten subject line. The rewritten subject line can be presented first, followed by a delimiter (e.g., common, semicolon, slash, pipe, quote brace) and the original subject line or vice versa. For example, the presentation component 210 can display a subject line as "PP|Free Breadsticks|Promotion Ends Monday (Free Breadsticks are an order away)."

Figure 3:
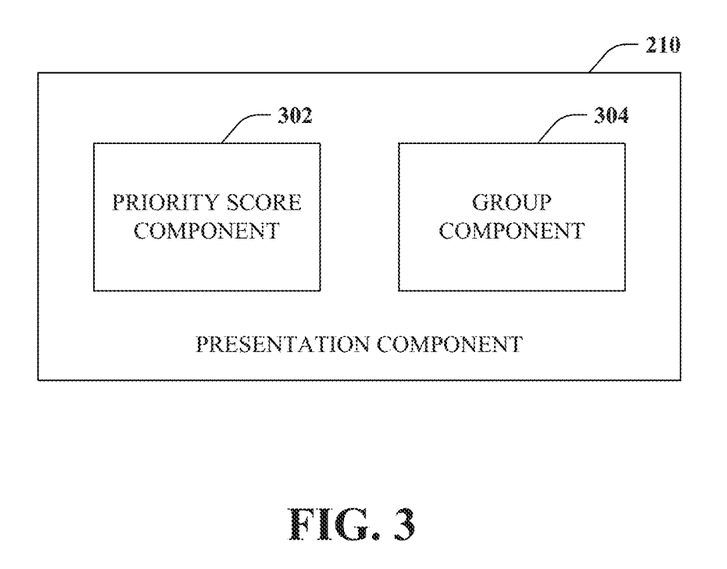
FIG. 3 is a block diagram of an example presentation component.

Turning to FIG. 3, the presentation component 210 is illustrated in further example detail. Here, the presentation component 210 includes a priority score component 302 and a group component 304, which can operate over emails with rewritten subject lines The priority score component 302 is operable to determine a measure of priority associated with an email. Priority can be measured based on a plurality of factors and available information. The information can be associated with the email itself or external to the email. For instance, a priority score can be generated based on the expiration date of an offer and the current date such that a sale that expires shortly (e.g., day, week, two weeks) can be of a higher priority than a sale that does not expire for an extended time (e.g., month or two). Further, emails from companies that a user typically transacts with can be of higher priority than those companies that the user has not shopped with or does so infrequently. This can be determined by acquiring and comparing historical transactions with the sender of the email. Of course, a combination of these and other factors can be considered in determining a priority score for an email.

The group component 304 is operable to group emails of different types and priorities. In one instance, the group component 304 can segment commercial emails from non-commercial emails. For example, emails seeking to elicit a purchase are placed in a different group than emails from friends, family, or colleagues. Identification of commercial emails is made prior to subject-line generation and replacement. Accordingly, the identification or classification can be reused to present a group of emails as commercial and noncommercial. Further, the group component 304 can employ priority scores for emails produced by the priority score component 302 to alter the order in which the emails are presented. For instance, a commercial email with a high priority score can be presented before a commercial email with a lower priority score or vice versa, depending on the overall presentation framework. In this manner, promotional emails from a business often frequented by a user and expiring shortly can be bubbled to the top in an attempt to alert a user or grab the user's attention. Further highlighting of the highest priority emails can also be performed. For example, a threshold for additional highlighting can be set for a priority score. If the priority satisfies the threshold, the email can be subject to additional highlighting or other graphical elements.

The aforementioned systems, architectures, platforms, environments, or the like have been described with respect to interaction between several components. It should be appreciated that such systems and components can include those components or sub-components specified therein, some of the specified components or sub-components, or additional components. Sub-components could also be implemented as components communicatively coupled to other components rather than included within parent components. Further yet, one or more components or sub-components can be combined into a single component to provide aggregate functionality. Communication between systems, components, or sub-components can be accomplished following either a push or pull control model. The components can also interact with one or more other components not specifically described herein for brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed thereby making portions of the systems and methods more adaptive as well as efficient and intelligent. By way of example, and not limitation, at least the commercial identification component 202 and analysis component 206 of the rewrite system 100 can employ such mechanisms. For instance, the commercial identification component 202 can utilize machine learning to classify emails as commercial or noncommercial. Similarly, such mechanisms can be utilized to summarize email content or extract salient facts.

In view of the example systems described above, methods that can be implemented in accordance with the disclosed subject matter will be better appreciated with reference to the flow chart diagrams of FIGS. 4-7. While, for purposes of simplicity of explanation, the methods are shown and described as a series of blocks, it is to be understood and appreciated that the disclosed subject matter is not limited by the order of the blocks, as some blocks can occur in different orders or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
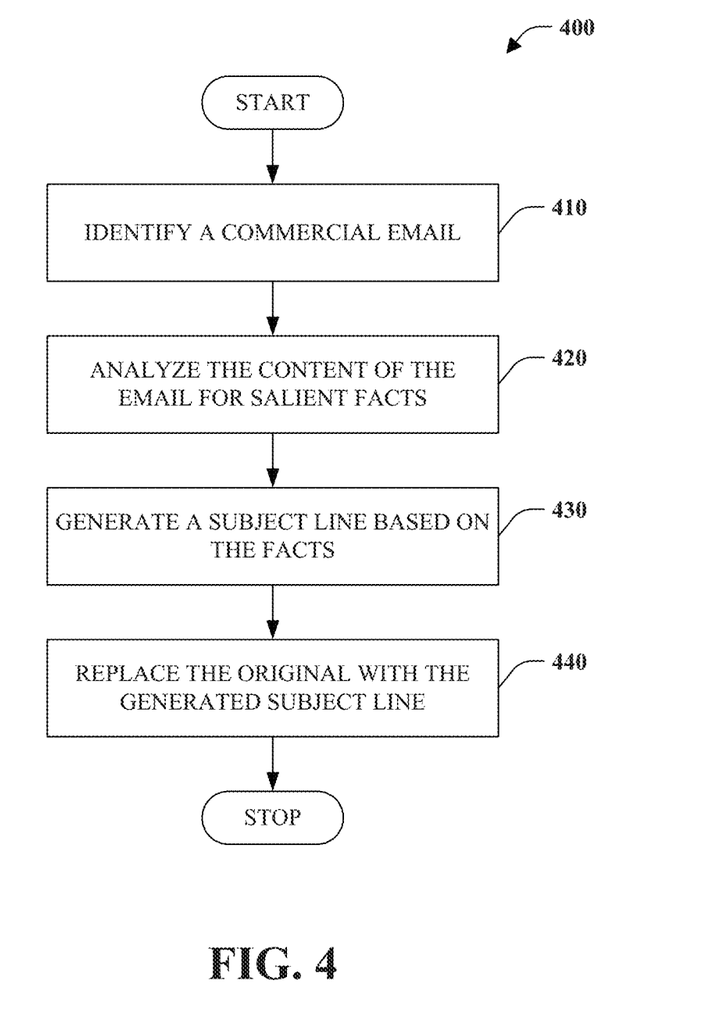
FIG. 4 is a flow chart diagram of a method of subject line rewriting.

Turning attention to FIG. 4, a method 400 of subject line rewriting is illustrated. The method 400 can be implemented or performed by the rewrite system 100 and components thereof.

At reference numeral 410, a commercial email is identified. A commercial email can be identified by comparing an email address to a set of email addresses known to be commercial. For example, a database of known commercial user names, domains, or both can be maintained and used to identify a commercial email. Further, email addresses or domains associated with a user's transaction history can also be saved and utilized to classify an email as commercial or noncommercial. A machine-learning classifier can also be employed to identify a commercial email automatically based on examples of prior known commercial addresses.

At numeral 420, the email content identified as a commercial email is analyzed. The analysis focuses on identifying salient facts, which are pieces of information that are prominent or conspicuous. Salient facts can include details regarding a sale or promotion, such as eligible products or services, discounts, conditions, and expiration dates. In one instance, pattern matching technologies (e.g., Regex) can be employed to identify salient facts. In another instance, a machine learning model can be developed and trained to identify such facts. In one particular implementation, text summary technology can be exploited to extract salient facts. For example, a transformer that combines a convolutional neural network with an attention model can be employed to summarize email content. The summary can thus comprise the salient facts. Further, the transformer can be tuned to identify sale or promotion information.

At reference numeral 430, an email subject line is generated from the facts. In one embodiment, a text summary produced by analysis of the email content can be returned as the email subject line. Alternatively, a subject-line template can be employed, which is filled or completed with the facts. The template can be a default template for all commercial emails. For example, the template can specify a good or service or class of good or service subject to a sale or promotion, the discount, any conditions, and expiration date. Alternatively, a variety of templates can be available and matched to a type of commercial email as determined by the facts, among other things. Further, personalized or customized templates can be employed for a particular user.

At reference numeral 440, the original subject line is replaced by the generated subject line. In one instance, an indication can be provided that the subject line was rewritten. Further, a mechanism can be provided to view the original subject line that was replaced. In one embodiment, the subject line can be written over by a browser extension. The original subject line can be replaced in another embodiment before providing the email to a user device for display.

Figure 5:
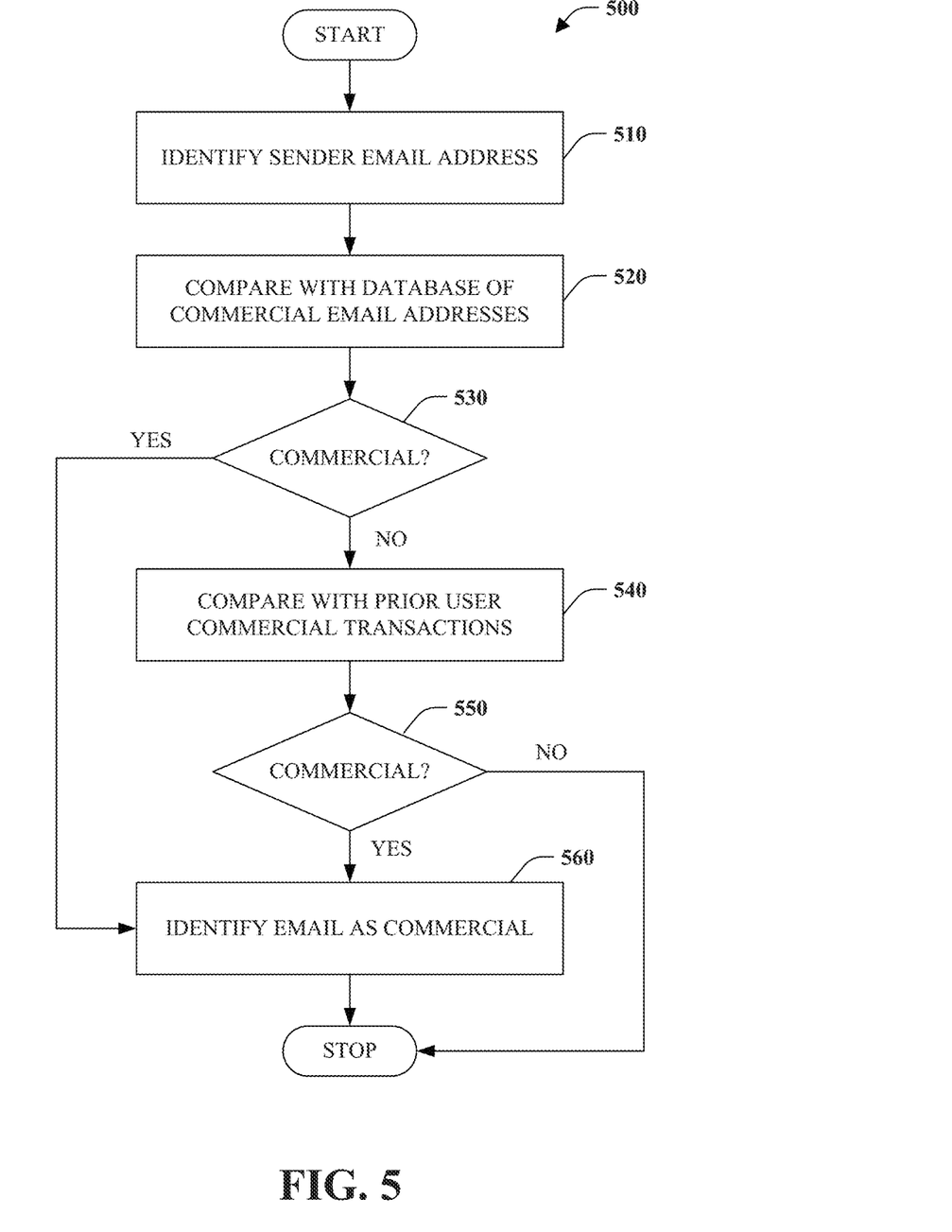
FIG. 5 is a flow chart diagram of a method of identifying a commercial email.

FIG. 5 depicts a flow chart diagram of a method 500 of identifying a commercial email. The method 500 can be implemented and performed by the rewrite system 100, and more particularly, the commercial identification component 202 in conjunction with one or more data stores 204.

At reference numeral 510, a sender email address is identified. An email client can receive a plurality of emails from various senders. Here, one of the emails is selected, and the sender's email address is identified.

At numeral 520, a comparison is performed between the sender email address and commercial email addresses stored in a database. The comparison can be between user name, domain name, or both. For example, if the email domain is "acmecompany" or "pizzaplanet," this can indicate that the email is commercial in nature. By contrast, an email from the "Gmail" domain might be personal and further comparison of the user name might be required to determine if it is commercial or not.

At reference numeral 530, a determination is made as to whether or not the email is deemed commercial or not based on the result of the comparison to known commercial email addresses. If the email is deemed commercial ("YES"), the method continues at 860, where the email is identified as commercial. Alternatively, if the email is deemed noncommercial ("NO") at 530, the method proceeds to numeral 540.

At numeral 540, the email is compared with prior user commercial transactions. It is possible that the first comparison to known commercial email addresses can be inadequate since there can be commercial email addresses that are unknown at the time. Accordingly, user transaction history can be utilized to identify a potential email address associated with a purchase transaction. The email can then be compared with emails stored for prior user commercial transactions.

At reference numeral 550, a determination is made as to whether or not the email address is a commercial email address based on the comparison of the email address to known commercial email addresses or other information associated with prior user commercial transactions. If the email is determined to be commercial ("YES"), the method proceeds to reference numeral 560, where the email is identified or otherwise labeled or tagged as commercial. If the email is determined to be noncommercial ("NO"), the method can terminate without labeling the email as commercial. The result is that the email is essentially identified as noncommercial.

Figure 6:
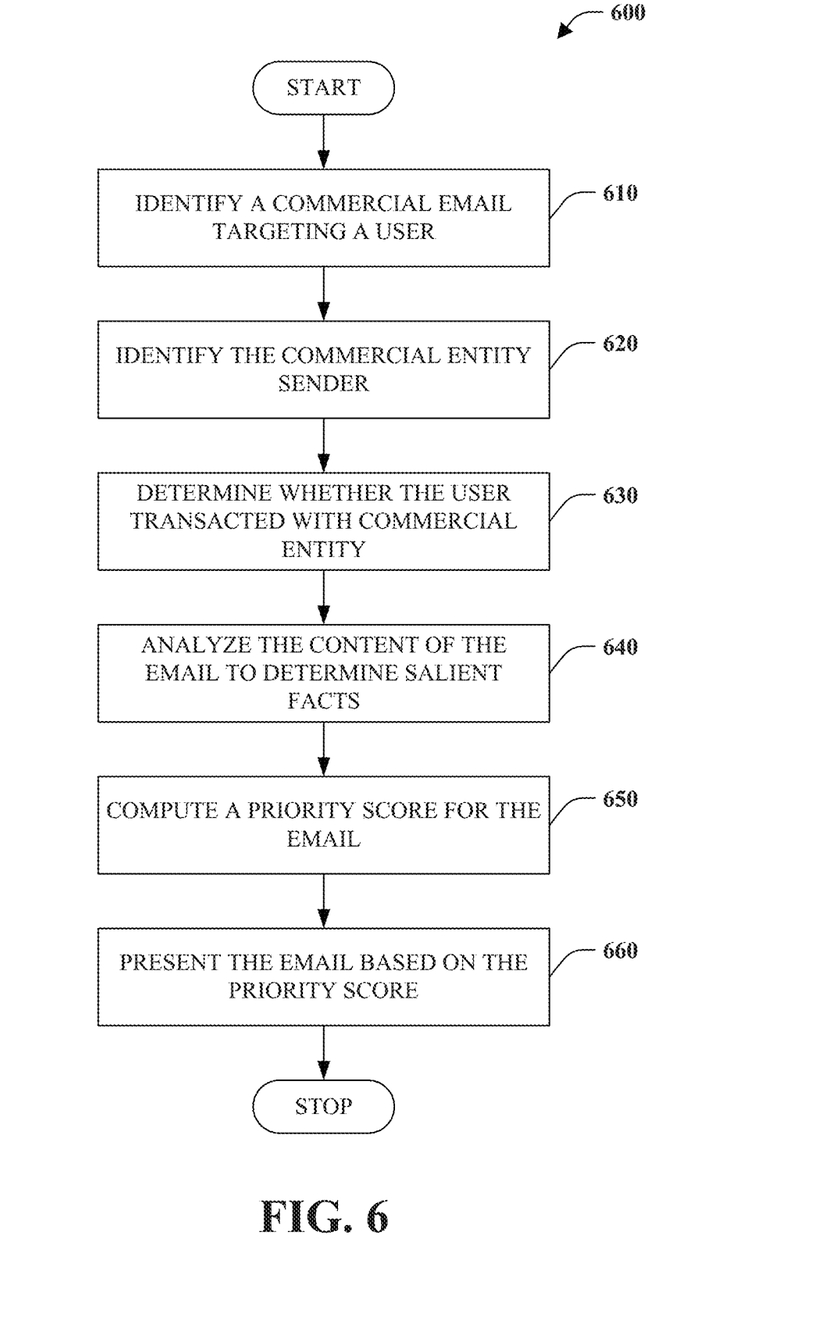
FIG. 6 is a flow chart diagram of a method of presenting an email.

FIG. 6 is a flow chart diagram of a method 600 of presenting an email. The method 600 can be implemented and performed by the rewrite system 100.

At reference numeral 610, a commercial email targeting a user is identified. Received emails can be analyzed and categorized as either commercial or not. For example, the email or portions thereof, such as the user name and domain name, can be compared to known commercial email addresses. If there is a match, the email can be labeled as a commercial email.

At numeral 620, a commercial entity associated with the email is identified. In one instance, identification can involve querying a database for the entity based on the email. Further, the email domain name can also reveal the commercial entity and be used for that purpose. For example, "username@xyzcompany.com" can indicate that the commercial entity is the "XYZ Company."

At reference numeral 630, a determination is made as to whether a user transacted with the identified commercial entity. User transaction history can be accessed, and a query performed for the commercial entity. If the query locates the commercial entity, the user can be said to have transacted with the commercial entity. Otherwise, the user can be said not to have transacted with the commercial entity.

At numeral 640, the content of the email is analyzed to determine salient facts regarding a sale, promotion, or the like. The context can be searched for particular elements in one implementation, including items or class of items, discount amount, conditions, and expiration date. In another implementation, a machine learning model can be developed and trained to identify such facts. In one particular implementation, text summary technology can be exploited to extract salient facts. For example, a transformer that combines a convolutional neural network with an attention model can be employed to summarize email content. The summary can thus comprise the salient facts. Further, the transformer can be tuned for identification of sale or promotion information.

At reference numeral 650, a priority score is computed for the email. The priority score reflects the significance of the email to a user, among other things. Accordingly, the score can depend on whether and to what extent a user has previously transacted with the commercial entity associated with the email. For example, if a user previously has not ever purchased a product or service from a commercial entity, the priority score would be much lower than the priority score for a commercial entity that the user purchases products or services from frequently. Other factors that can affect the score include the extent of the discount offered as well as the expiration date, among other things. For example, an email providing a twenty-five percent discount can have a higher priority score than a five percent discount. Further, an email disclosing an offer that expires within the next day or two can have a higher priority score than one that does not expire for two months. As such, the priority score need not be static but rather can change over time.

At reference numeral 660, the email is presented based on the priority score. In other words, the email can be ordered in a group of commercial emails based on the priority score computed for the email. For example, emails with greater priority scores can be presented above other emails with lower priority scores such that the highest priority emails rise to the top to grab a user's attention. In one particular instance, the ordered emails can have their subject lines rewritten based on the salient facts to make the email more informative.

Figure 7:
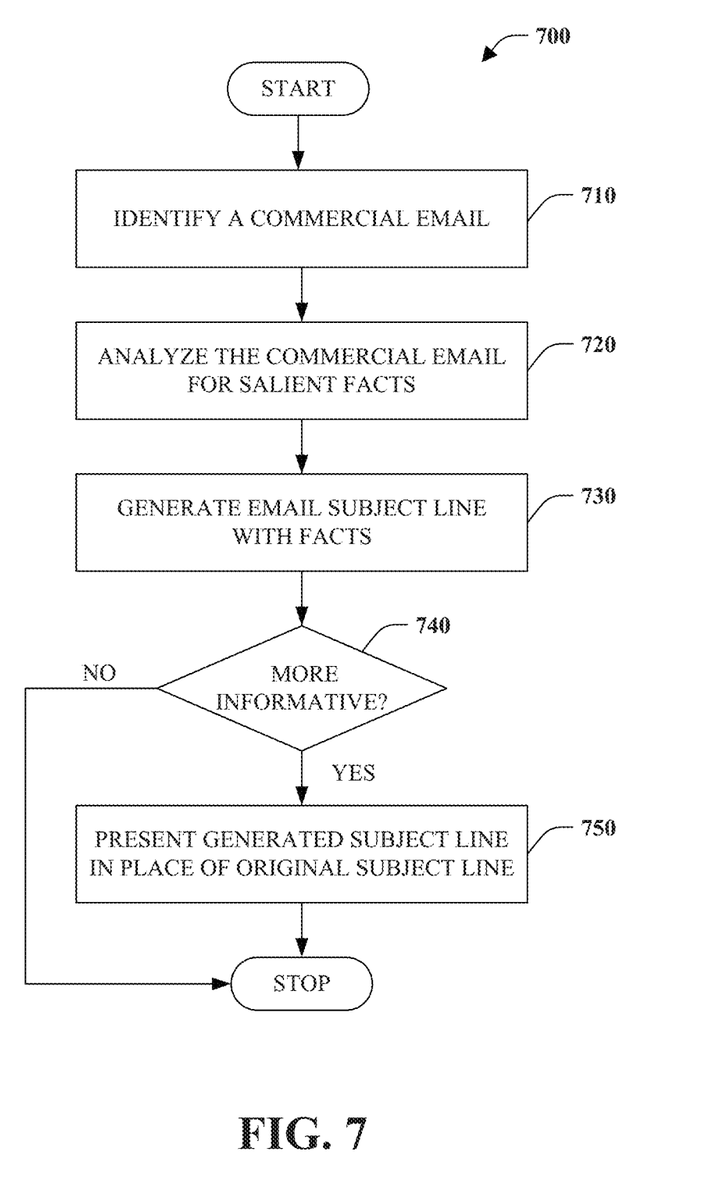
FIG. 7 is a flow chart diagram of subject line rewriting.

FIG. 7 is a flow chart diagram illustrating a method 600 of subject line evaluation and replacement. The method 700 can be implemented and performed by the rewrite system 100, and more particularly, the subject line component 208.

At reference numeral 710, a commercial email is identified. The commercial email can be identified by comparing the email to a database of known commercial emails or emails associated with an entity with which a user has previously purchased products or services. In one instance, the domain name in an email can indicate whether the email is commercial or not. In other instance, the entire email, including the user name and domain name, need to be compared to known commercial addresses. Further, a machine learning model can be developed to classify emails as commercial or noncommercial, for example, based on a supervised learning approach.

At numeral 720, the identified commercial email is analyzed for salient facts. Salient facts are pieces of information that are prominent or conspicuous, including details regarding a sale or promotion such as the items, discount, conditions, and expiration date. In one instance, a search for patterns or particular data can be performed, for example, using regular expressions. Alternatively, a machine learning model can be generated and used to identify pertinent information automatically. Further, text summary technology can be employed to extract salient facts. For example, a transformer that combines a convolutional neural network with an attention model can summarize the text. The analysis can also include image analysis technology to extract facts from images or graphics common in commercial emails. For instance, optical character recognition can be performed to identify text included within an image or graphic.

At reference numeral 730, an email subject line is generated. The subject line can correspond to a text summary generated during the analysis of the commercial email. Further, pertinent information or facts surrounding a commercial email can be extracted from the summary or otherwise determined or inferred and used to complete a template. A template can specify the form and information in the subject line. In one instance, a default template can be filled in with facts regarding an item for sale, discount offered, conditions (e.g., purchase of $50 or more), and expiration date.

At numeral 740, a determination is made as to whether or not the generated subject line is more informative than the original subject line. The generated and original subject lines can be analyzed and scored. The score can represent how informative the subject line is with respect to communicating information important to understanding a commercial email and any offer included. It is typical for a subject line to motivate someone to open an email to acquire details. However, if a subject line already includes the required information, it need not be replaced. Scores that measure information conveyed can be compared to each other. The method can terminate if the generated subject line is not more informative than the original subject line ("NO"). If the generated subject line is more informative than the original subject line ("YES"), the method can proceed to 750.

At reference numeral 750, the generated subject line is presented in place of the original subject line in a user interface depicting an inbox of received emails. Further, an indication can be provided that the subject line was replaced.

For example, a graphical element can be added to or activated for the subject line of an email. Additionally, or alternatively, the font or color of the subject line can be different from emails with the original subject line. Further, a mechanism can be provided that allows a user to view the original subject line.

The subject disclosure pertains to the technical problem of electronic mail, particularly conveying helpful information regarding commercial emails. The technical solution includes identifying commercial emails, analyzing the content of the mail, generating a subject line that conveys valuable information, and replacing the original subject line with the generated subject line. Further, the solution can present commercial emails in a group ordered by a measured priority based on salient facts of the email information regarding a user, among other things. Furthermore, machine learning models can be developed and invoked to automatically identify commercial emails and generate a subject line from email content.

As used herein, the terms "component" and "system," as well as various forms thereof (e.g., components, systems, sub-systems), are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or can be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
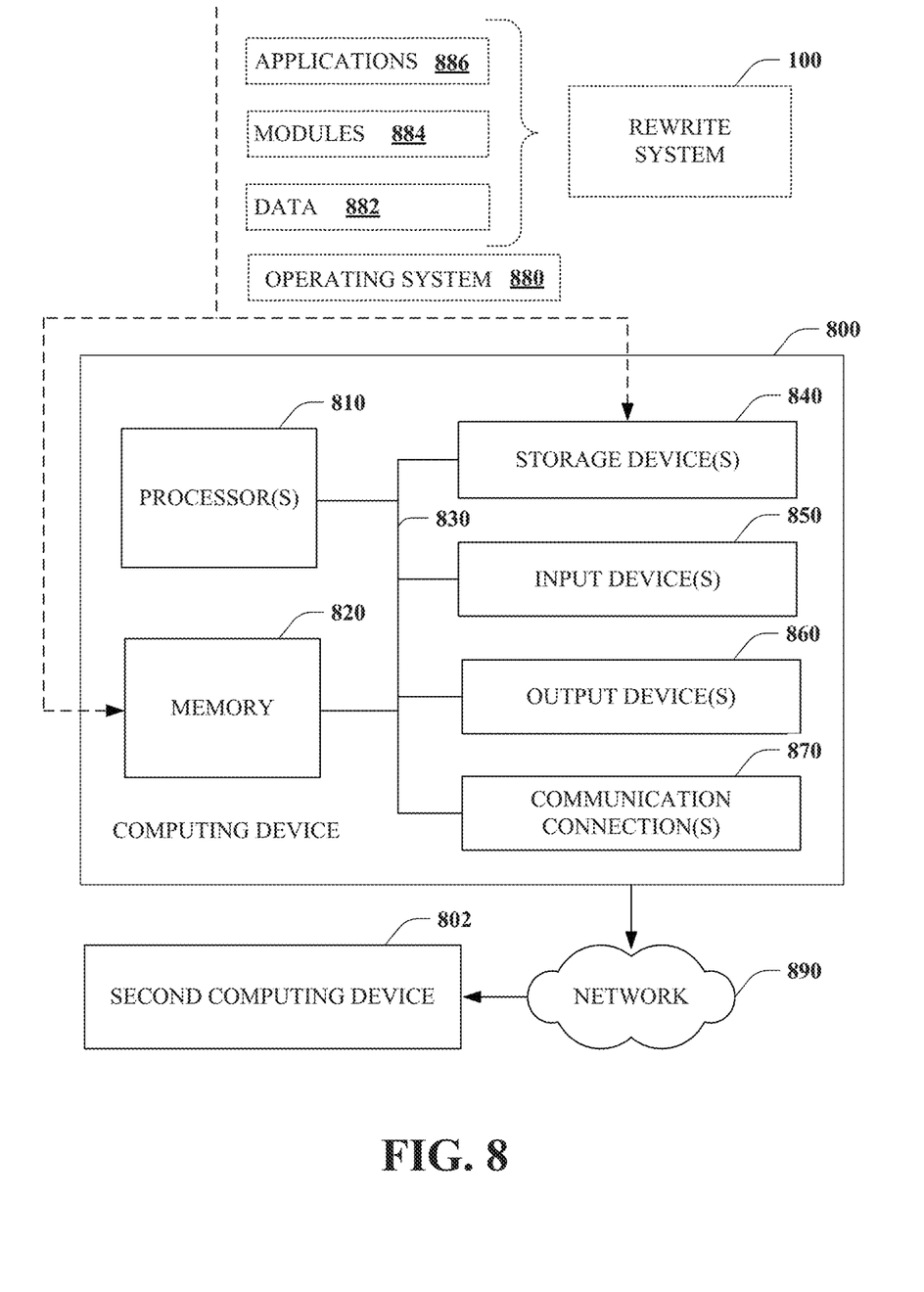
FIG. 8 is a block diagram illustrating a suitable operating environment for aspects of the subject disclosure.

To provide a context for the disclosed subject matter, FIG. 8, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules can be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node, . . . ). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 810 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 can be volatile (e.g., random access memory (RAM)), non-volatile (e.g., read-only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming or engineering techniques to produce software, firmware, hardware, or any combination thereof to control the computing device 800 to realize the disclosed functionality. By way of example and not limitation, all or portions of the rewrite system 100 can be, or form part of, the application 886, and include one or more modules 884 and data 882 stored in memory or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the rewrite system 100 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a local area network (LAN) or a wide area network (WAN) such as the Internet. In one instance, the computing device 800 can correspond to an email client. The second computing device 802 can be another processor-based device that interacts with the computing device 800 to receive and display electronic mail. In another instance, the computing device 800 can execute the rewrite system 100, for example, as an extension to an email application, and the second computing device can store known commercial email addresses or user transaction history that can be received, retrieved, or otherwise obtained or acquired by the computing device 800 over the network 890.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. An email rewrite system, comprising:
a processor coupled to a memory that includes instructions that, when executed by the processor, cause the processor to:
identify a commercial email from a set of email messages received by an email client for a user with a first machine learning model trained to classify emails as commercial or noncommercial;
analyze content of the commercial email to identify salient facts comprising terms of a sale specified in the commercial email with a second machine learning model trained to summarize content;
generate a proposed subject line based on the salient facts;
replace an original subject line of the commercial email with the proposed subject line in the email client; and
add an indicator to the subject line that indicates the subject line is rewritten and, when activated, displays the original subject line of the commercial email.

2. The system of claim 1, wherein the first machine learning model performs natural language processing to classify the email messages based on email message content.

3. The system of claim 2, wherein the instructions further cause the processor to extract the email message content from an image with a third machine learning model trained to perform optical character recognition.

4. The system of claim 1, wherein the first machine learning model is trained to classify the email messages based on transaction history of a user and seller email addresses.

5. The system of claim 1, wherein the second machine learning model is a transformer that combines a convolutional neural network with an attention model.

6. The system of claim 1, wherein the instructions further cause the processor to:
compute a difference between an original subject line and the proposed subject line in terms of descriptiveness; and
replace the original subject line with the proposed subject line when the difference satisfies a predetermined threshold.

7. The system of claim 1, further comprising instructions that cause the processor to identify a subject-line template and fill the template with the salient facts to produce the proposed subject line.

8. The system of claim 1, further comprising instructions that cause the processor to compute a priority score for the commercial email based on prior user transaction data.

9. The system of claim 8, further comprising instructions that cause the processor to render a set of commercial emails based on the priority score.

10. A method, comprising:
executing, on a processor, instructions that cause the processor to perform operations, the operations comprising:
identifying a commercial email from a set of emails received by an email client for a user;
analyzing content of the commercial email to identify a salient facts comprising terms of a sale specified in the commercial email with a first machine learning model trained to summarize content;
generating a proposed subject line based on the salient facts;
replacing an original subject line of the commercial email with the proposed subject line in the email client; and
adding an indicator to the subject line that indicates the subject line is rewritten and, when activated, displays the original subject line of the commercial email.

11. The method of claim 10, wherein the operations further comprise comparing an email address to an email address associated with transaction history of the user to identify the commercial email.

12. The method of claim 10, wherein the operations further comprise identifying the commercial email with a second machine learning model trained to classify emails as commercial or noncommercial based on email message content.

13. The method of claim 10, wherein the operations further comprise invoking, as the first machine learning model, a transformer to automatically identify the salient facts, wherein the transformer combines a convolutional neural network with an attention model.

14. The method of claim 10, wherein the operations further comprise determining a priority score for the commercial email based on prior user transaction data.

15. The method of claim 14, wherein the operations further comprise rendering a set of commercial emails based on the priority score for each commercial email.

16. The method of claim 10, wherein the operations further comprise:
comparing content of an original subject line of the commercial email to the proposed subject line; and
replacing the original subject line of the commercial email with the proposed subject line when a result of the comparing satisfies a predetermined threshold.

17. A computer-implement method of email rewriting, comprising:
identifying commercial email from a set of emails received by an email client for a user with a first machine learning model trained to identify commercial emails based on email message content;
determining at least one salient fact from context of the commercial email with a second machine learning model trained to summarize content, wherein the at least one salient fact corresponds to a term of a sale or promotion in the commercial email;
generating a proposed subject line based on the at least one salient fact and a template associated with a type of the commercial email; and
replacing an original subject line with the proposed subject line.

18. The method of claim 17, further comprising invoking image analysis to extract text from an image in the commercial email, wherein the text forms part of the email message content in at least one of determining the at least one salient fact or identifying the commercial email.

19. The method of claim 17, further comprising determining the at least one salient fact with a transformer that combines a convolutional neural network with an attention model.

20. The method of claim 17, further comprising:
determining a priority score for the commercial email; and
causing a set of commercial emails to be ordered based on the priority score determined for each email.

* * * * *